US010182276B2

(12) United States Patent
Dahlfort et al.

(10) Patent No.: US 10,182,276 B2
(45) Date of Patent: Jan. 15, 2019

(54) METHOD AND MANAGEMENT NODE FOR DECIDING PORTS SUITABLE TO BE COMMUNICATIVELY CONNECTED TO EACH OTHER IN A COMMUNICATIONS NETWORK

(71) Applicant: TELEFONAKTIEBOLAGET L M ERICSSON (PUBL), Stockholm (SE)

(72) Inventors: Stefan Dahlfort, Stockholm (SE); Kim Laraqui, Solna (SE); Christopher Price, Palo Alto, CA (US); Ming Xia, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 163 days.

(21) Appl. No.: 14/888,359

(22) PCT Filed: Jun. 19, 2013

(86) PCT No.: PCT/SE2013/050731
§ 371 (c)(1),
(2) Date: Oct. 30, 2015

(87) PCT Pub. No.: WO2014/178766
PCT Pub. Date: Nov. 6, 2014

(65) Prior Publication Data
US 2016/0088375 A1    Mar. 24, 2016

Related U.S. Application Data

(60) Provisional application No. 61/818,937, filed on May 3, 2013.

(51) Int. Cl.
*H04Q 11/00* (2006.01)
*H04L 12/26* (2006.01)
(Continued)

(52) U.S. Cl.
CPC ...... *H04Q 11/0062* (2013.01); *H04J 14/0283* (2013.01); *H04J 14/0286* (2013.01);
(Continued)

(58) Field of Classification Search
CPC ..... H04L 43/0805; H04L 49/15; H04L 41/12; H04J 14/0283; H04J 14/0286; H04Q 11/0003; H04Q 11/0062
See application file for complete search history.

(56) References Cited

U.S. PATENT DOCUMENTS 7,380,025 B1    5/2008  Riggins et al.
2007/0177597 A1*  8/2007  Ju ..................... H04L 12/4641
                                                    370/392
(Continued)

FOREIGN PATENT DOCUMENTS

EP    2525532 A1    11/2012

OTHER PUBLICATIONS

Directive 1995/5/EC of the European Parliament and of the Council of Mar. 9, 1999, Official Journal of the European Communities, Jul. 4, 1999, pp. L91/10-28.
(Continued)

*Primary Examiner* — Mina Shalaby
(74) *Attorney, Agent, or Firm* — Patent Portfolio Builders, PLLC

(57) ABSTRACT

A method and management node for deciding ports suitable to be communicatively connected to each other in a communications network. The communications network comprises an available port communicatively connected to the communications network, and a discovered port that is discovered as being communicatively connected to the communications network. The management node obtains Information associating at least the available port and the discovered port with respective one or more attributes and with a respective attribute identifier identifying the respective one or more attributes. The management node receives, from a port discovering network node, a message comprising the attribute identifier associated with the discovered port. The management node decides that the available port is suitable
(Continued)

to be communicatively connected with the discovered port based on that the respective one or more attributes are considered matching.

30 Claims, 7 Drawing Sheets

(51) Int. Cl.
*H04L 12/933* (2013.01)
*H04J 14/02* (2006.01)
*H04L 12/24* (2006.01)

(52) U.S. Cl.
CPC .......... *H04L 43/0805* (2013.01); *H04L 49/15* (2013.01); *H04Q 11/0003* (2013.01); *H04L 41/12* (2013.01)

(56) References Cited

U.S. PATENT DOCUMENTS

2007/0230458 A1 10/2007 Baba et al.
2012/0016973 A1* 1/2012 Haris ..................... H04L 49/00
  709/220

OTHER PUBLICATIONS

Handley, et al., SDP: Session Description Protocol, RFC 4566, Jul. 2006.

* cited by examiner

Lower tier network

| SN | Item |
|---|---|
| A001 | Cells site router, 1Gbps Eth port |
| B002 | Cells site router, 10Gbps Eth port |
| C003 | DSLAM, 1Gbps Eth port |
| D004 | Enterprise switch, 1Gbps Eth port |
| E005 | Enterprise switch, 10Gbps Eth port |
| F006 | LTE RRH, 1.25 Gbps CPRI port |
| G007 | LTE RRH, 2.5 Gbps CPRI port |

Higher tier network

| SN | Item |
|---|---|
| H008 | IP Edge router line card, 1Gbps ports |
| J008 | IP Edge router line card, 10Gbps ports |
| K010 | BNG, 1Gbps ports |
| L011 | Ethernet switch line card, 10 Gbps ports |
| M012 | LTE DU card, 1.25 Gbps/CPRI ports |
| N013 | LTE DU card, 2.5 Gbps/CPRI ports |

Port identifiers • Equipment type • Nominal data rate • Physical layer protocol

Fig. 5

| | | | |
|---|---|---|---|
| SN | "Mobile – Access Eth 1Gbps" | SN | "Mobile – Service Edge Eth 1Gbps" |
| A001 | Cells site router, 1Gbps Eth port | H008 | IP Edge router line card, 1Gbps ports |
| SN | "Mobile – Access Eth 10Gbps" | SN | "Mobile – Service Edge Eth 10Gbps" |
| B002 | Cells site router, 10Gbps Eth port | J008 | Ethernet switch line card, 10Gbps ports |
| SN | "Mobile – Access CPRI 1.25Gbps" | SN | "Mobile – Service Edge CPRI 1.25Gbps" |
| F006 | LTE RRH, 1.25 Gbps CPRI port | M012 | LTE DU card, 1.25 Gbps CPRI ports |

Attribute indicating belonging to higher tier network or lower tier network — Communication type — Nominal data rate — Equipment type — Port identifiers — Physical layer protocol

Fig. 6

METHOD AND MANAGEMENT NODE FOR DECIDING PORTS SUITABLE TO BE COMMUNICATIVELY CONNECTED TO EACH OTHER IN A COMMUNICATIONS NETWORK

TECHNICAL FIELD

Embodiments herein relate to a method in a management node and a management node. In particular embodiments herein relate to deciding of ports suitable to be communicatively connected to each other in a communications network.

BACKGROUND

Conventional approaches to transporting mobile, business, and residential service traffic have dedicated different parallel communications networks to transporting the traffic of different services. More recent approaches, by contrast, contemplate transporting the traffic of those different services together using the same network. Converging the different parallel networks into one common network in this way would prove more efficient and cost-effective.

Aggregating the data traffic of multiple services at a data packet level through so-called packet aggregation presents one option for realizing such a "converged" communications network, which may be referred to as an "aggregated" communications network. But while data packet aggregation currently requires less hardware expense, it proves difficult to scale as data traffic volume increases and involves significant complexity. Aggregating the data traffic of multiple services in the optical domain, e.g., using wavelength division multiplexing (WDM), is more promising in this regard. However, one obstacle to realizing managing such network is that establishment of communicative connections between optical ports comprised in nodes of the WDM optical network is cumbersome, typically time consuming and is requiring more manual intervention than desirable.

SUMMARY

Hence, in view of the above, an object of embodiments herein is to overcome, or at least alleviate, problems in the prior art, or to present an alternative solution. A more specific object is to facilitate establishment of communicative connections between ports comprised in a communications network, in particular in a wavelength division multiplexed, "WDM" optical network in the form of an aggregated communications network.

According to a first aspect of embodiments herein, the object is achieved by a method in a management node for deciding ports suitable to be communicatively connected to each other in a communications network. The communications network comprises an available port that is comprised in a first network node. The available port is communicatively connected to the communications network. The communications network also comprises a discovered port that is comprised in a second network node. The discovered port is a port discovered as being communicatively connected to the communications network. The method comprises to obtain information associating at least the available port and the discovered port with respective one or more attributes and with a respective attribute identifier identifying the respective one or more attributes. The method further comprises to receive, from a port discovering network node, a message comprising the attribute identifier associated with the discovered port. Moreover, the method comprises to decide that the available port is suitable to be communicatively connected with the discovered port based on that the respective one or more attributes are considered matching.

According to a second aspect of embodiments herein, the object is achieved by a management node for deciding ports suitable to be communicatively connected to each other in a communications network. The communications network comprises an available port that is comprised in a first network node. The available port is communicatively connected to the communications network. The communications network also comprises a discovered port that is comprised in a second network node. The discovered port is a port discovered as being communicatively connected to the communications network. The management node comprises an obtaining circuitry configured to obtain information associating at least the available port and the discovered port with respective one or more attributes, and with a respective attribute identifier identifying the respective one or more attributes. The management node further comprises a receiving port configured to receive, from a port discovering network node, a message comprising the attribute identifier associated with the discovered port. Moreover, the communications network comprises a deciding circuitry configured to decide that the available port is suitable to be communicatively connected with the discovered port based on that the respective one or more attributes are considered matching.

Embodiments herein facilitate implementing a network design, including establishing desired communicative connections between ports in the communications network, e.g. in an automated fashion.

BRIEF DESCRIPTION OF THE DRAWINGS

Examples of embodiments herein are described in more detail with reference to the appended schematic drawings, in which:

FIG. 5 is a table showing a simplified example of how multiple attributes may be associated with each one of multiple ports and of deciding based on matching one or more attributes.

FIG. 6 is a table that is similar but slightly differently structured than the table in FIG. 5.

DETAILED DESCRIPTION

Figure 1:
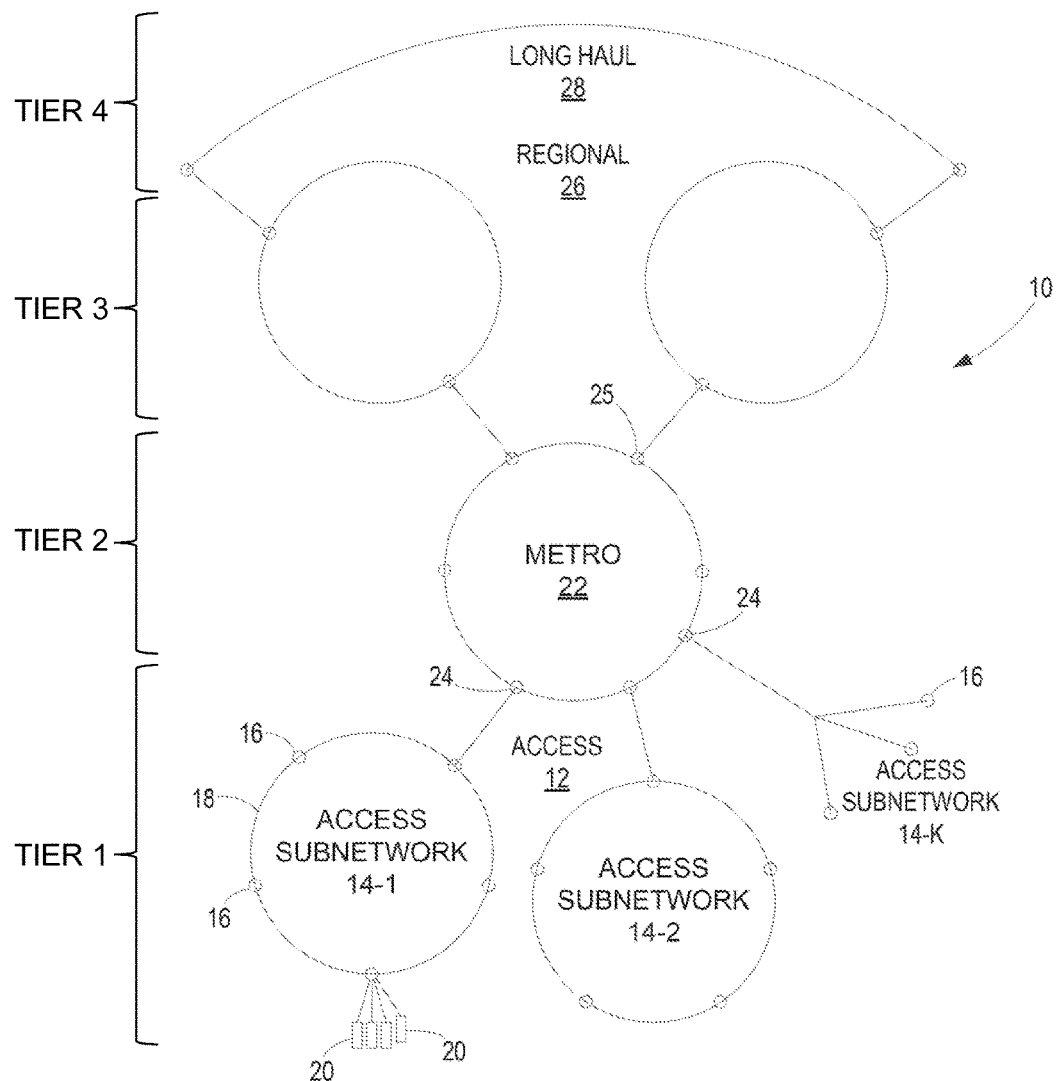
FIG. 1 is a schematic block diagram depicting, as an example, a first communications network in which embodiments herein may be implemented.

FIG. 1 is a schematic block diagram depicting, as a first example, a first communications network 10 in which embodiments herein may be implemented. The first communications network 10 is hierarchical and comprises multiple levels, or tiers, of subnetworks. The communications network 10 may fully or partly implemented as, but is not limited to, a WDM optical network in the form of an aggregated communications network, sometimes also called aggregation type of communications network. Sometimes, the term "metro" is used alternatively or in addition to "aggregation", where "metro" refers more to the geographical area rather than the function, as will be understood from the below. Several tiers are shown to illustrate and explain in a non-limiting way the principle. A lowest tier shown, tier 1, is an access network 12 comprising a plurality of access subnetworks 14-1, 14-2, . . . 14-K. Each access subnetwork 14-k is formed from multiple access subnetwork nodes 16 interconnected via optical fiber 18 in a ring structure, a tree structure, a bus structure, or the like.

In general, each access subnetwork node 16 communicatively connects to one or more client nodes 20, e.g., a remote radio unit, a base station, a wireless access point, or the like. Deployed at each client node 20 may be one or more, e.g. optical, ports that may be provided in a respective one or more modules. A port module may e.g be a hot-pluggable or hot-swappable module that is deployed at one of the client nodes 20 by being physically plugged into that client node 20. Examples of such a pluggable module include, for instance, a Small Form-factor pluggable (SFP) transceiver module, an XFP transceiver module, etc. Regardless, the shown communications network 10 comprises one or more access subnetwork node 16 communicatively connected to one or more of these clients nodes 20 and may e.g. be configured to aggregate the wavelength channels on which those client nodes 20 transmit uplink traffic and places (i.e., adds) the aggregated wavelength channels onto the access subnetwork 14 it forms. Similarly, the access subnetwork node 16 drops from the access subnetwork 14 the wavelength channels on which downlink traffic is transmitted to those client nodes 20. An access subnetwork node 16 may therefore be appropriately referred to as an access add-drop (AAD) point.

The access network 12 in turn connects to a higher-tiered network, namely, a metro network 22 at tier 2. The metro network 20 is formed from a plurality of interconnected Central Office (CO) nodes 24. Each CO node 24 aggregates wavelength channels from one or more access subnetworks 14 to which it is connected such that the aggregated wavelength channels are "hubbed" to a hub node 25 in the metro network 22. The hub node 25 in turn routes wavelength channels from one or more CO nodes 24 to a higher-tiered network called a regional network 26. More specifically, the hub node 25 routes wavelength channels to an appropriate one of multiple service nodes (not shown), e.g., a business service router, a residential services or mobile services Broadband Network Gateway (BNG), a Broadband Remote Access Server (BRAS), etc. The service node then routes uplink traffic from the wavelength channels (typically at the packet level) towards an appropriate destination, such as to content servicers, back towards the access networks, to the Internet, etc. Such service node routing may entail sending the uplink traffic to the regional network, which operates back at the optical layer. Thus, although omitted from FIG. 1 for simplicity of illustration, the hub node 25 connects to multiple service nodes and the service nodes in turn connect to the regional transport network 26. In an aggregated communications network having two hubs is common, but also one or three or more for large networks may be used.

The regional network 26 is also formed from a plurality of interconnected peer network nodes, which place the uplink traffic onto a long haul network 28 at tier 4, for inter-regional transport. Downlink traffic may propagate through the networks in an analogous, but opposite, manner.

In figures that will be discussed below, entities that are less central in the context of embodiment herein, but nevertheless useful for understanding of the same, are drawn with dashed lines. Non-limiting examples of communication paths are indicated by double arrows. Finely dashed double arrows between ports are for exemplifying in a visualizing way, a communicative connection established between these ports, which will be further discussed and exemplified below.

Figure 2:
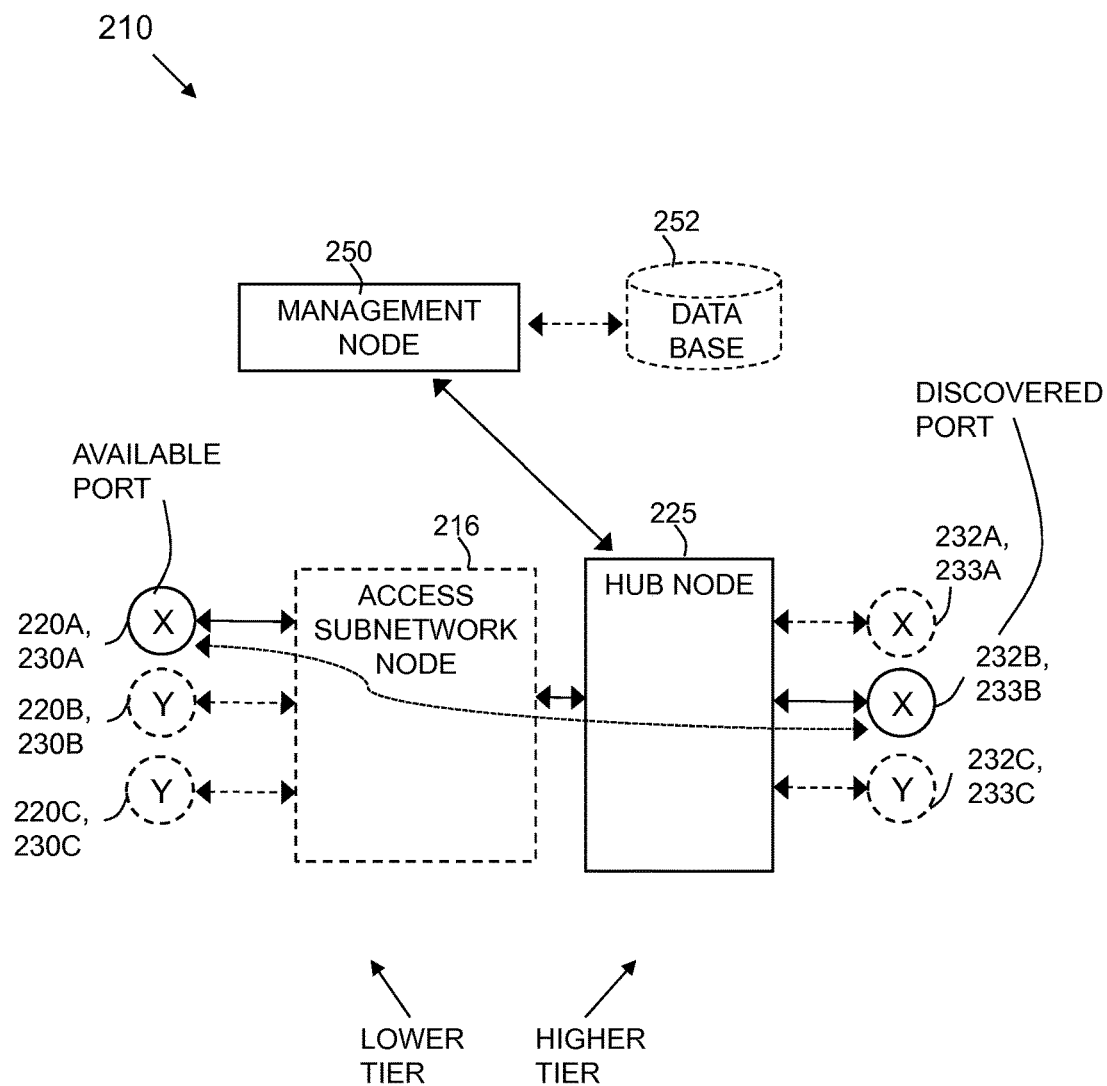
FIG. 2 is a schematic block diagram depicting, as another example, a simplified view of a second communications network in which embodiments herein may be implemented.

FIG. 2 is a schematic block diagram depicting, as another example, a simplified view of a second communications network 210 in which embodiments herein may be implemented. The second communications network 210 may correspond, but is not limited, to an aggregated WDM optical network such as discussed above. The communications network 210 may correspond to part of the communications network 10 shown in FIG. 1. For example, the second communications network 210 comprises a hub node 225 that may correspond to the hub node 25 discussed above and the shown access subnetwork node 216 may correspond to the access subnetwork node 16 mentioned above. The second communications network is also hierarchical and comprises a lower tier part that is a subnetwork to a higher tier part. The lower tier network may correspond to the tier 1 discussed above and the higher tier network to the tier 2 network discussed above.

The shown second communications network 210 further comprises a management node 250 that is a node configured to carry out managing tasks, such as controlling, configuring, monitoring etc., in the second communications network 210, with regard to one or more other nodes. The management node 250 may e.g. comprise or correspond to a Transport Network Controller (TNC) or similar. The shown communications network 210 also comprises a data base 252 that may be accessible through a server and may be comprised in a separate node from the management node 250, or may be comprised the same node as the management node 250. The management node 250 and the data base 253 will be further discussed below.

Moreover, FIG. 2 depicts a plurality of nodes 220A-C and 232A-C, each comprising a respective one of a plurality of ports 230A-C, 233A-C. For reasons of convenient presentation and in order not to burden the reader with too many details, the respective node and the port it comprises have been drawn as one single entity. In practise it is realized that each port is only a small part of the node and that in some embodiments there may be multiple ports per node, not only one as here illustrated.

The nodes and ports 220A-C, 230A-C are network nodes and ports that may be named "client", "client-side", "access", "access-side" nodes and ports respectively, since they are in the lower tier part that typically is where client nodes utilizing services from service nodes in the higher tier part are located. Correspondingly, the nodes and ports 232A-C, 233A-C are network nodes and ports that may be named e.g. "service", "service-side", "service edge" or "edge-side" nodes and ports respectively. When the second communications network is a WDM optical network, or another optical network, the ports 230A-C, 233A-C are optical ports.

The hub node 225 in FIG. 2 is configurable to route traffic between any one of the ports 230A-C and any one of the ports 233A-C. In case of a WDM optical network, the hub node 225 configures the routing of a wavelength channel. The management node 250 may be configured to control the hub node 225, for example in order to make the hub node 225 route traffic between desired ports.

As part of the development towards embodiments herein and in the context of what has been discussed above, the problem indicated in the Background will now be further discussed before describing a method according to embodiments herein. For example, in case of an aggregated WDM optical network as discussed above, the "client-side" ports 230A-C may be deployed for transmitting uplink traffic towards and receiving downlink traffic from one or more of the "edge-side" ports 233A-C. This traffic is then transmitted and received via access subnetwork node 216 and hub node 225. Any given port 230A-C may transmit and receive traffic for a particular type of service (e.g., mobile, business, or residential) provided by a particular service provider. Moreover, any given client-side port 230A-C may transmit and receives such traffic at a particular nominal data rate, e.g., 1 Gigabit, 10 Gigabits, 2.5 Gigabits, etc., using a particular physical layer protocol, e.g., Ethernet, Common Public Radio Interface, etc., and a particular line code and modulation format, e.g., Non-Return to Zero, Carrier-Suppressed Return-to-Zero, Alternate-Phase Return-to-Zero, phase shift keying, etc. This means the uplink traffic transmitted by a given client-side port 230A-C may ultimately need to be routed to one of the edge-side ports 233A-C that matches in the sense that this edge-side port supports the particular type of service to which the uplink traffic pertains, supports the particular service provider providing that type of service, supports the particular physical layer protocol and line code with which the uplink traffic is transmitted, and the like. Ports that match in this sense may be referred to as matching. Conversely, downlink traffic from any given edge-side port 233A-C must ultimately be routed to one of the client-side port 230A-C that matches in an analogous sense.

Hence, generally, there are typically a number of attributes associated with each port that must be matching in order for the ports to be considered matching, which in turn may be decisive or even needed for deciding whether or not to communicatively connect the ports with each other. Note e.g. that some attributes, such as physical layer protocol etc., may need to be matching for communication between the ports to be possible and some attributes, such as type of service, location of the port in the higher or lower tier part etc., may need to be matching for communication to be of interest. In FIG. 2, ports that have one or more attributes that are matching in this sense have been marked with the same letter, X or Y, to facilitate visualization. Each letter X and Y thus correspond to a set of one or more attributes, where sets marked X are matching each other and sets marked Y are matching each other. There may also be further one or more attributes associated with each port, e.g. there may be an attribute associated with port 233B, marked with X, that indicate belonging of the port to the higher tier part, and another attribute associated with port 230A, also marked X, that indicate belonging of the port to the lower tier part.

Ports that are communicatively connected to each other refers herein to that ports are connected to each other in the sense that traffic in the communications network comprising the ports is routed between the ports in a way that is supported by both ports. The traffic may be in one or both directions between the ports.

A typical scenario in an aggregated WDM optical network as discussed above, see e.g. the second communications network 210 in FIG. 2 for reference, is that there are a number of already available ports at various nodes in the network, say e.g. nodes and ports 220A-C, 230A-C, 232A,C and 233A,C. Then a new port is installed and made communicatively connected to the communications network 210. When a port is communicatively connected to the second communications network 210, or to a communications network in general, it is implied that this is accomplished by connection of the port and the node the port is comprised in, to another node, and implicitly a port of that node, that is already communicatively connected to and part of the communications network in question. Said another node thus acts as a connection node. For example, say port 233B in node 232B is being communicatively connected with the hub node 225 and is thereby communicatively connected to the second communications network 210.

In order for the hub node 225 to be able to use the port 233B it first must be discovered, which may be done manually or automatically. After discovery of the port 233B, there has to be a decision regarding which, if any, of the already available ports, is or are suitable to be communicatively connected with the port 233B. To make this decision it is realized that attributes that are used for the matching must be available for all ports involved, not only for the port 233B. However, the nodes comprising the ports are typically geographically distributed throughout the communications network. Also, as may be realized from the attribute examples given above, attributes of interest may pertain to the ports, or to the equipment they are comprised in, as such, but not all attributes are of this kind. Even in the case of attributes associated with the port and/or equipment of the port, not all of such attributes are possible, at least not with reasonable cost and complexity, to read out from the port, or equipment comprising the port, by a node in the communications network, e.g. the hub node 225, to which the port is communicatively connected. Also, there may e.g. be switches or other equipment in-between that is preventive or obstructive.

In conclusion, establishing communicative connections between matching ports is not straightforward, and as explained in the Background typically cumbersome, time consuming and requiring more manual intervention than desirable. It is thus desirable to facilitate establishment of communicative connections between ports comprised in a communications network, in particular in a wavelength division multiplexed, "WDM" optical network in the form of an aggregated communications network. It is further desirable that any solution for establishment of communicative connections should support automatization, multi-operators, multi-vendors, regarding e.g. the equipments comprising the ports, and multi-service (as is the case for an aggregated communications network) as described above.

Note that an aggregated communications network primarily provide multi-point to single point transport of data traffic and is focused towards the use of hubs. In contrast, the transport of data traffic in a more conventional, communications network is typically multi-point to multi-point. Such conventional communications networks may be referred to as "meshed", or "meshed connectivity", communications networks. Note, however, that a communications network may include some aggregation and still provide multi-point to multi-point transport of data traffic. Core or backbone networks of many cellular communications networks are examples of communications networks that comprise multi-point to multi-point transport of data traffic.

Figure 3:
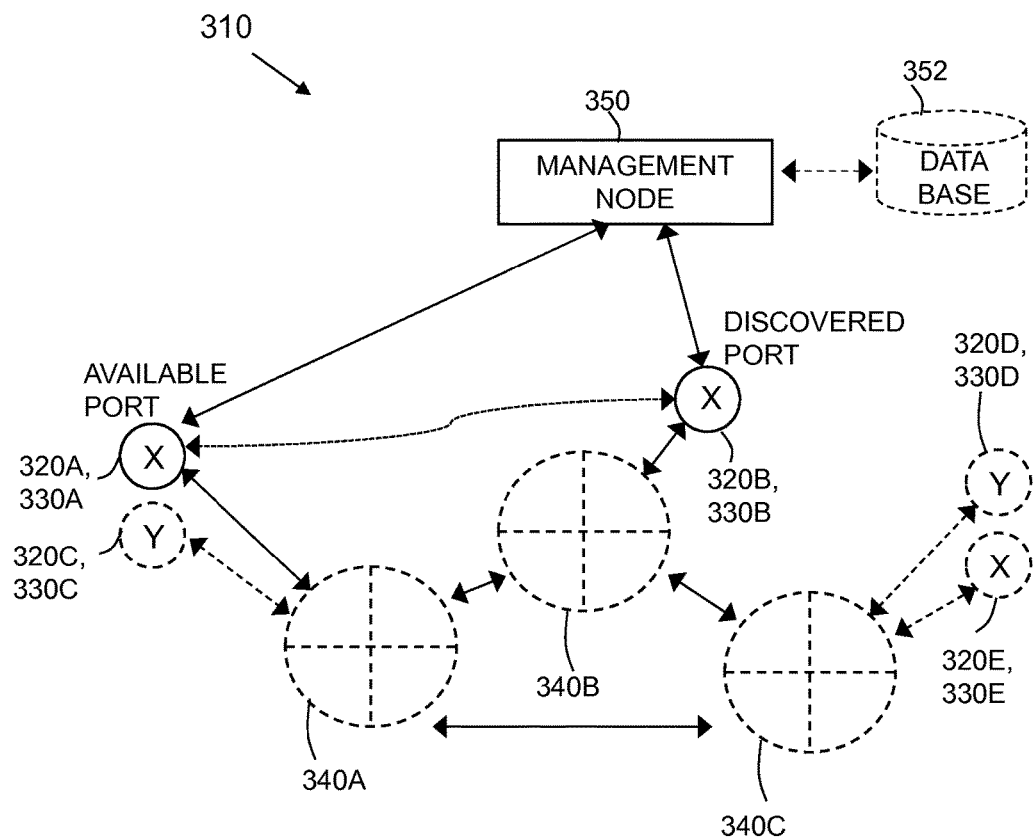
FIG. 3 that is a schematic block diagram depicting, as yet another example, a simplified view of a third communications network in which embodiments herein may be implemented.

Before describing a method according to embodiments herein, attention is drawn to FIG. 3 that is a schematic block diagram depicting, as yet another example, a simplified view of a third communications network 310 in which embodiments herein may be implemented. The third communications network 310 comprise multi-point to multi-point transport of data traffic and may correspond, but is not limited, a core or backbone network of a cellular communications network. Note that although meshed, the third communications network may be WDM optical network as well. Note that, in order not to be unnecessary lengthy and repetitive, mainly differences compared to the second communications network 210 will be described. Things that are not pointed out to de differing may be regarded having corresponding function, properties etc. as described for the corresponding feature in FIG. 2. The shown third communications network comprises a management node 350 with corresponding management function or functions as described for the management node 250 in FIG. 2. The management node may correspond to or comprise a device, for example a server, that implements functionality pertaining to what may be referred to as Domain Management (DM) and/or Network Management System (NMS). This may be the case when the third communications network is a core network of a cellular communications network. For example, when the third communications network 310 is Long Term Evolution (LTE)-based as defined by the 3rd Generation Partnership Project (3GPP). The shown communications network 310 also comprises a data base 352 that may correspond to the database 252 discussed above. Moreover, FIG. 3 depicts a plurality of nodes 320A-E, each comprising a respective one of a plurality of ports 330A-E. The ports and nodes may be similar as the plurality of nodes, and ports in FIG. 2 with regard to the ports and nodes as such, it is rather how they relate to the communications network that mainly differ. For example, in the third communications network there is no higher and lower tier part, no hub node, and no access subnetwork node. As a result a port does typically not belong to any particular tier or "side" of the network and it is thus of limited meaning with attributes specifying this. The communication network 310 is instead shown comprising, to illustrate the "meshed" nature, a plurality of interconnecting network nodes 340A-C, which respectively is a network node that connects, e.g. by routing communicative traffic between, multiple nodes in the third communication networks. The interconnecting network nodes 340A-C may be nodes that have other functions as well. Although not show, there may also be interconnecting networks nodes that comprises one or more ports, each corresponding to any one of the plurality of ports 330A-E. Just to give some examples, one or more of the nodes comprising respective port may correspond to a radio base station, that e.g. may be referred to as an Radio Base Station (RBS) or the like, eNB or eNodeB, when the third communications network 310 corresponds to a core network of an cellular communications network, e.g. LTE-based. Although typically a separate node, it should be noted that in some embodiments the management node 350 may at the same time be an interconnecting network node, such as any one of the plurality of interconnecting network nodes 340A-C, and/or a node comprising a port, such as any one of the plurality of nodes 320A-E.

Attention is drawn to that the communications networks and situations schematically shown in FIGS. 1-3 are merely simplified examples and not every detail is a prerequisite for embodiments herein, as will be understood from the below.

To facilitate understanding in view of the above and make it simpler to keep ports apart in examples below, one port will be assumed to be discovered in the above described sense and referred to as a "discovered port", the other ports will be assumed already available, and in particular one of these, as an example, will be referred to as an "available port". It will further be assumed that the discovered port matches the available port in the above described sense. However, it should be realized that the discovered port also may be considered to be an available port and that, of course, already available ports also may have been discovered at some point in time. Also that there in practise may be cases where ports does not match. What is described herein is not dependent on and should not be limited on what specific port has been exemplified as discovered and what specific port has been exemplified as available.

Moreover, in the following, to facilitate understanding of relations to what has been described above: "Communications network 210, 310" will be used to refer to a communications network that may be any one of the communications networks 210, 310. "Management node 250, 350" will be used to refer to a management node that may be any one of the management nodes 250, 350. "Available port 230A, 330A" will be used to refer to a port that may be any one of the ports 230A, 330A, and thus, as explained above, serving to exemplify a respective available port. "First network node 220A, 230A" will be used to refer to a network node that may be any one of the nodes 220A, 320A. "Discovered port 233B, 330B" will be used to refer to a port that may be any one of the ports 233B, 330B, and thus, as explained above, serving to exemplify a respective discovered port. "Second network node 232B, 330B" will be used to refer to a network node that may be any one of the nodes 232B, 330B.

Figure 4:
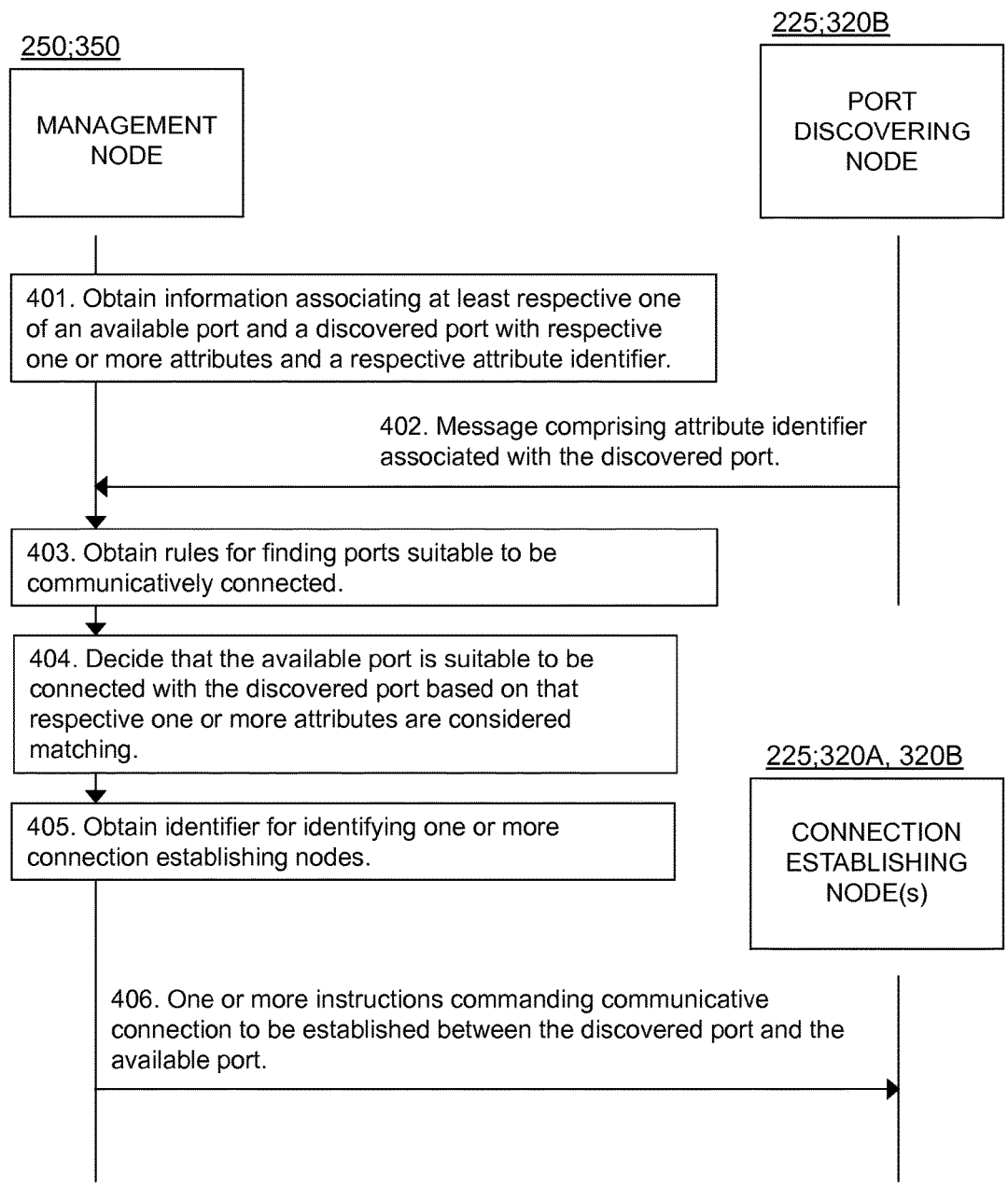
FIG. 4 is a combined signaling diagram and flow chart for illustrating examples of embodiments herein.

Examples of embodiments herein relating to a method in the management node 250, 350 for deciding ports suitable to be communicatively connected to each other in the communications network 210, 310, will now be described with reference to the combined signaling diagram and flowchart depicted in FIG. 4. The communications network 210, 310 comprises the available port 230A, 330A comprised in the first network node 220A, 320A. The available port 230A, 330A is communicatively connected to the communications network 210, 310. The communications network 210, 310 also comprises the discovered port 233B, 330B comprised in the second network node 232B, 320B. The discovered port 233B, 330B is a port discovered as being communicatively connected to the communications network 210, 310. In some embodiments, the communications network 210, 310 is a WDM optical network and the discovered port 233B, 330B and the available port 230A, 330A is a respective optical port in the WDM optical network.

In some embodiments, a port, such as the available port 230A, 330A or the discovered port 233B, 330B, being communicatively connected to the communications network 210, 310 comprises that the port is providing a physical communications channel connecting it to a connection node of the communications network 210, 310, e.g. the hub node 225 or the interconnecting network node 340A and/or the interconnecting network node 340B. As a result, information being sent in the communications network is enabled to be sent via the physical communications channel to and/or from the port. When the communications network 210, 310 is a WDM optical network, the physical communications channel is a wavelength channel.

In some embodiments, a port, such as the available port 230A, 330A or the discovered port 233B, 330B, being communicatively connected to the communications network 210, 310 comprises that the port has been assigned a respective logical address in the communications network 210, 310. The logical address enables information being sent in the communications network to be addressed to and thereby reach the port.

The following actions may be taken in any suitable order.

Action 401

The management node 250, 350 obtains information that associates at least the available port 230A, 330A and the discovered port 233B, 330B with respective one or more attributes, and with a respective attribute identifier. The respective attribute identifier identifies the respective one or more attributes. Typically the obtained information concerns all ports that are available, such all ports 230A-C, 233A-C, 330A-E.

The one or more attributes for a specific port are thus possible to identify and thereby find based on only the associated attribute identifier.

The information may have been stored in and is obtained from the data base 252, 352, but may alternatively e.g. have been stored as simple text file or similar somewhere else, but preferably so that the information is easily and quickly, accessible by the management node 250, 350. The information associated with a certain port may be entered into the data base 252, 352.

The information, including the one or more attributes, may have been compiled at some earlier point in time. Some or all of the one or more attributes may have been extracted from the equipment comprising the ports. There may be many different ways of accomplishing such extraction. In addition to ways of doing it that are further explained below, e.g. bar code scanning from equipment or data sheets, download of information from the Internet, manually entering information etc., the information may be input via a common interface or tool, e.g. using a mobile application in a mobile device used during installation.

Further, the information may have been entered into the data base 252, 352 via some interface, e.g. a mobile application, that makes sure, or reduces the risk, of attributes being entered in a wrong format and/or that formats entered information into a desired format that facilitate comparison when the information is obtained from the data base 252, 352.

The one or more attributes and examples thereof will be further discussed separately below.

In some embodiments the respective attribute identifier comprises a port identifier identifying the respective available port 230A, 330A and discovered port 233B, 330B independently on that the respective port is communicatively connected to the communications network 210, 310. That is, the port identifier should not change depending on how, where or when the corresponding port is communicatively connected to the communications network and thus a logical address or similar in the communications network 210, 310 may for these embodiments be excluded as the port identifier. This provides simpler and safer attribute identification. Moreover, the port identifier is preferably unique, at least among the ports of concern, e.g. among all ports associated with the management node 250, 350. Suitable as a port identifier is e.g. a serial number of the port as such, or of a module and/or equipment comprising the port. In case of several ports per equipment, a serial number of the equipment may be used with an individual identifier, e.g. a letter or number, added at the beginning or end and that differ between the ports.

In some embodiments the attribute identifier comprises an equipment identifier identifying a respective equipment associated with the respective available port 230A, 330A and discovered port 233B, 330B independently on that the respective port is communicatively connected to the communications network 210, 310. Suitable as an equipment identifier is e.g. a serial number of the equipment that the port is comprised in.

Note that in case of only one port per equipment, the equipment identifier is at the same time a port identifier and vice versa.

Some attributes may be naturally associated with the equipment as such and therefore convenient to store, e.g. in the data base 252, 352, with association to the equipment identifier. Some other attributes may be directly associated with the port as such and therefore convenient to store with association to the port identifier. As a result, a combination of a separate equipment identifier and a separate port identifier may be advantageously used as the attribute identifier, although of course the combination as such thus is a port identifier as well. For example, consider an optical port in the form of a, in the equipment, pluggable module that via a serial number thereof, corresponding to a port identifier, is associated with a first set of attributes pertaining to the module, and thus the port, as such. These attributes may be physical layer, i.e. physical communications channel, related, e.g. wavelength range, OTN framing etc. The equipment, in which the module with the port is plugged, has another serial number, corresponding to an equipment identifier, that is associated with another, second set, of attributes, e.g. physical layer protocol. The two serial numbers in combination may then e.g. be used to identify the two sets of attributes, that together form attributes associated with the port.

Another example of port and/or equipment identifier is an Ethernet MAC address (in case of Ethernet ports). An advantage of using Ethernet MAC addresses is that they are in a predetermined format, globally unique, and easy to receive from communicatively connected port, e,g, by a node comprising auto-discovery functionality. Basically it is only needed to receive an Ethernet frame, and thus no complex communication is needed. A drawback is of course that not all equipment use Ethernet, and that Ethernet MAC addresses not typically are included in order/shipping documentation from the equipment vendor.

Action 402

The management node 250, 350 receives a message comprising the attribute identifier associated with the discovered port 233B, 330B. The message is received from a port discovering network node, e.g. the hub node 225, or the node of the discovered port 233B, 330B, i.e. the second network node 232B, 330B.

The port discovering node may have discovered the discovered port 233B, 330B as being communicatively connected to the communications network 210, 310 and sent the message in response thereto. The port discovering network node may advantageously be a node that comprises some port auto-discovery functionality, such as a port discovery unit or the like. For example, when the communications network 210, 310 is an aggregated WDM optical network as discussed above, the port discovering network node may be the hub node 225 comprising a port discovery unit. However, although embodiments herein may advantageously be used with automatic discovery of ports, exactly how the port discovering node has discovered the discovered port 233B, 330B as communicatively connected to the communications network it is comprised in, is not crucial for embodiments herein. The port discovering node may in some embodiments be a network node from which someone has manually initiated sending of the message, in response to that the discovered port 233B, 330B has been communicatively connected to the communications network 210, 310. This someone may e.g. a person that have physically installed the discovered port 233B, 330B, or an equipment comprising the discovered port 233B, 330B, and made it communicatively connected to the communications network 210, 310.

In some embodiments the received message further comprises additional one or more attributes associated with the discovered port. The additional one or more attributes may, after the message have been received, added to and included with the one or more attributes from the obtained information and that are associated with the discovered port.

It has been found that it is often difficult, or even impossible to be able to automatically extract all kind of attributes that may be of interest to use. However, in the context of embodiments herein, it is realized that it may suffice to extract the attribute identifier in connection with discovery of the discovered port 233B, 330B. In some embodiments, the attribute identifier is extracted, preferably automatically, by the port discovering network node.

An attribute identifier in the form of a port identifier or equipment identifier may, as already mentioned, be a serial number or similar. There is typically a Command Line Interface (CLI), or Simple Network management Protocol (SNMP) interface, available via most ports of interest and that may be used to send a command to a network node and equipment comprising the port. The equipment may respond with information comprising e.g. its own serial number and serial numbers of modules, ports etc. comprised therein. An option in case of optical ports comprised in optical modules may be to use an identifier of the optical module as the attribute identifier. The identifier of the optical module may be received via an in-band OAM channel between the optical module accomplished via the optical modules to e.g. the management node 252 when corresponding to a TNC as mentioned above, and for example supported with integrated Optical Transport Network (OTN) framing in the optical modules.

If information is gathered for how a serial number or similar can be automatically extracted, e.g. as exemplified above, this may be utilized e.g. by an auto-discovery function in the port discovering node. For example, information about e.g. CLI commands, user name, passwords, etc., for extracting a suitable attribute identifier, such as serial number, from an equipment comprising ports may be retrieved from the vendor of the equipment and for example stored in a database that may be the database 252, 352 or similar. The operator using the equipment in the communications network 210, 310 may then use this information to e.g. make scripts that can be used in the port discovering node, e.g. by an auto-discovery function implemented therein, to be able to automatically extract the desired attribute identifier from the equipment comprising the discovered port 233B, 330B.

Action 403

This is an optional action for embodiments herein. The management node 250, 350 obtains rules for finding ports suitable to be connected, which finding is based on matching attributes. The rules may be defined according to a desired network design that in turn may be defined by an operator associated with the management node 250, 350. The operator may influence which attributes to store e.g. in the data base 252, 352 and/or will be aware of which attributes are available for setting up the rules. This makes it relatively easy for operators to define and implement a desired network design. Some examples on rules are given below.

Action 404

The management node 250, 350 decides that the available port 230A, 330A is suitable to be connected with the discovered port 233B, 330B based on that the respective one or more attributes are considered matching. This is discussed and exemplified in further detail below.

When the management node 250, 350 obtains rules according to action 403, the respective one or more attributes are considered matching based on the obtained rules.

Action 405

This is an optional action for embodiments herein. The management node 250, 350 obtains an identifier for identifying one or more connection establishing nodes, e.g. the hub node 225 or the first network node 320A, associated with the available port 230A, 330A. Additionally or alternatively, the management node 250, 350 obtains an identifier for identifying one or more connection establishing nodes, e.g. the hub node 225 or the second network node 320B, associated with the discovered port 233B, 330B. This if for enabling the management node 250, 350 to send one or more instructions, see next Action 406, to execute the decision in Action 404.

In some embodiments, the identifier for identifying one or more connection establishing nodes 225, 320B associated with the discovered port 233B, 330B comprises a logical address assigned to the discovered port 233B, 330B. Additionally or alternatively, in some embodiments, the identifier for identifying one or more connection establishing nodes 225, 320A associated with the available port 230A, 330A may comprises a logical address assigned to the available port 230A, 330A. The logical address, e.g. an Internet Protocol (IP)-address in the communications network 210, 310, may advantageously be used since it directly enables addressing and sending of the one or more instructions in the next action. However, in other embodiments the identifier for identifying one or more connection establishing nodes may be more indirect or even implied. For example in cases where the port discovering node and the connection establishing node are the same node, e.g. the hub note 225, and this is known by the management node 250, 350. Receipt of the message from the hub node 225 may in such case, at the same time, be receipt of the identifier for identifying the hub node 225 as connection establishing node.

Action 406

This is an optional action for embodiments herein. The management node 250, 350 sends one or more instructions to at least one of the respective one or more connection establishing nodes, e.g. the hub node 225, the first network node 320A and/or the second network node 320B. The sending is based on at least one of the respective, from Action 405, obtained identifiers for identifying the respective one or more connection establishing nodes. The one or more instructions are commanding a communicative connection to be established between the available port 230A, 330A and the discovered port 233B, 330B. The sending is further made in response to that the available port 230A, 330A was decided as suitable to be connected with the discovered port 233B, 330B.

In some embodiments, the one or more instructions are further commanding configuration of at least one of the discovered port 233B, 330B and the available port 230A, 330A based on at least one of the one or more attributes associated with the respective port 230A, 233B, 330A, 330B. This e.g. enable adapting the ports based on the one or more attributes and e.g. in response to the matching of attributes. For example, in some embodiments, the one or more attributes associated with the available port and/or the one or more attributes associated with the discovered port may respectively comprise alternative attributes, e.g. two attributes that represent incompatible physical layer communications protocols. Each alternative attribute may require configuration of the available port 230A, 330A and/or discovered port 233B, 330B, respectively, to make said alternative attributes valid, i.e. "in force", for the respective port 230A, 233B, 330A, 330B.

In some embodiments, at least one of said one or more connection establishing nodes comprises the hub node 225. The hub node 225 being configured to route traffic between one or more ports of a higher tier network, e.g. the higher tier network 22, of the communications network 210 and one or more ports of a lower tier network, such as the access subnetwork 14-1, that is a sub-network to the higher tier network. In such embodiments, both the one or more attributes associated with the available port 230A, 330A, and the one or more attributes associated with the discovered port 233B; 330B, may comprise a respective attribute that indicates belonging of the respective port to the higher tier network or to the lower tier network.

Note that the method above has been described in a situation where matching ports are found. However, it is realized that the method easily may be supplemented with one or more actions for handling also a non-matching situation. In such situation the discovered port may simply be remembered as (yet another) available port that later may be matching another, new discovered port. Port that are available in this sense may be remembered by being kept in a "wait-list", as ports pending for connection, and from which wait-list a port e.g. is removed when it decided to communicatively connect it with a matching port.

The one or more attributes mentioned above in connection with FIG. 4 will now be separately exemplified and discussed.

In some embodiments, both the one or more attributes associated with the available port 230A, 330A, and the one or more attributes associated with the discovered port 233B, 330B, comprise a respective attribute that identifies a service type. The service type indicating traffic of a particular type of service that is associated with the respective port. More detailed examples of types of services were given above.

In some embodiments, both the one or more attributes associated with the available port 230A, 330A, and the one or more attributes associated with the discovered port 233B, 330B, comprise a respective attribute that identifies communication properties associated with the respective port. Communication properties may indicate what is required by another port to be able to be communicatively connect to the port in question. Communication properties may e.g. comprise one or more of: a nominal data rate (e.g., 1 Gigabit, 10 Gigabits, 2.5 Gigabits, etc.), a particular physical layer protocol (e.g., Ethernet, Common Public Radio Interface, etc.), particular line code (e.g., Carrier-Suppressed Return-to-Zero, Alternate-Phase Return-to-Zero, etc.).

In some embodiments, both the one or more attributes associated with the available port 230A, 330A, and the one or more attributes associated with the discovered port 233B, 330B comprise a respective attribute identifying a desired number of connections between the first network node 220A, 320A and the second network node 232B, 330B. This kind of attributes e.g. enables a meshed communications network as the communications network 310 discussed in connection with FIG. 3 to be handled in a similar manner as an aggregated network, such as the communications network 210 discussed in connection with FIG. 2. In the latter case, each port may be grouped into one of two partitions depending on if the port belongs to the lower tier or higher tier part, i.e. "client side" or "service side". As mentioned above, an attribute may be used that identifies this belonging. However, in the former case, each node comprising a port may be considered a partition of its own. The attribute identifying a desired number of connections between the first network node 220A, 320A and the second network node 232B, 330B, or in general attributes identifying a respective number of desired connections between a node comprising a port and another node comprising a port, thus enable network design in a similar manner for the former case as for the latter case. How many connections there should be between the nodes in the latter case is typically a natural part of network design, which may be referred to as traffic matrix. The network design may be divided in a set of attributes that must match, e.g. X as exemplified and discussed above. Each port, or each node, since all ports of the same node typically has same set of attributes X, may be added as a respective entry in e.g. the data base 252, 352 together with a respective attribute identifying a respective desired number of connections to one or many other nodes in the data base. When equipment is being communicatively connected to the communications network 310, the port, or ports, comprised in the equipment may thus be communicatively connected to other ports based on the information from the data base and according to the network design. This facilitates implementing such network design in an automated fashion. More complex network design may be possible through use of the above described obtained rules and/or by e.g. letting the one or more attributes associated with each port comprise an additional attribute that adds a priority to each desired connection to another node. For example, rules of the type "make connection between nodes A-B connection before between nodes A-C", "make primary and protection connections between nodes A-B" etc. may be used.

Moreover, in some embodiments, the one or more attributes associated with the available port 230A, 330A, and the one or more attributes associated with the discovered port 233B, 330B are respectively comprising one or more attributes identifying:

a hardware version associated with the port, and/or
a firmware version associated with the port, and/or
a software version associated with the port, such as operating system, etc Note that the one or more attributes associated with the available port 230A, 330A and/or the one or more attributes associated with the discovered port 233B, 330B may respectively comprise different attributes of same type, which different attributes are valid simultaneously for the respective port. For example, there may be ports that support e.g. multiple communication rates and auto-selects a rate that is compatible with the port is being communicatively connected with and/or that simultaneously supports multiple types of services etc.

Also, note that rules may be specified, and/or some of the one or more attributes associated with the respective port, may be dynamic (i.e. time varying).

FIG. 5 is a table showing a first simplified example of how multiple attributes may be associated with each one of multiple ports. The table is also an example of deciding based on matching multiple attributes. C.f. for example Action 404 above and a respective port belonging to a lower tier network, e.g. the discovered port 233B, that is suitable to be communicatively connected with a respective port, e.g. the available port 230A, belonging to a higher tier network. In the table a respective port, and attributes associated therewith, is identified by a respective port identifier that is a respective serial number (SN) being an example of the attribute identifier discussed above. Each port is further identified by respective attributes being: physical layer protocol, equipment type and nominal data rate, and belonging to the lower tier network or the higher tier network. The shown table, or corresponding information, may e.g. be stored in the data base 252, and may be obtained as described for Action 401 above. It should be noted that the shown exemplifying table not only contains information associating respective port with the respective one or more attributes and the attribute identifier (here SN), but also information about which port shall be connected to which other port. This information may be stored, for example in a data base such as the database 252, 352, together with the one or more attributes and the attribute identifier, but may also be stored separately e.g. as a list where serial numbers are mapped to each other as in the table. In any case, as should be noticed, the ports have been matched based on that the respective one or more attributes are considered matching.

The matching may have been done, e.g. by a network designer or network planner, fully or partly manually based on the information associating the respective port with respective one or more attributes, or fully or partly automatically based on the same information and e.g. obtained rules as discussed above. In case of automatic application of obtained rules, it is of course possible and may even be preferred to apply the obtained rules in real time, e.g. in response to that the message is received as described for action 402 above.

It should be understood that there is typically some freedom in terms of design preferences, polices etc., for deciding between which ports communicative connections shall be established. For example, the Enterprise switch port in the table may in principle, but e.g. depending on network design preferences and end-user service agreement, be connected to either BNGs, IP edge routers, or even plain Ethernet switches for further transport to service edge nodes at other locations.

FIG. 6 is a table showing another simplified example, recognized as a similar but slightly differently structured table than in FIG. 5 and will therefore not be discussed in full detail. However, as an example, see the 10 Gbps cells site router, which the network designer in this case has wanted communicatively connected to an Ethernet switch, which in turn can be connected to one or more Serving Gateways, Mobility Management Entities (MMEs), Radio Network Controllers (RNCs), Base Station Controller (BSC), other transport networks etc.

Note that the shown tables or similar, and e.g. obtained rules resulting in corresponding mapping, need not be constrained to a one-to-one mapping. On the contrary, for example, a 1 Gbps access port might be possible to match to numerous devices. Also, there may be matching criterions, e.g. according to obtained rules, based on other attributes that here shown and e.g. based on characteristics of equipment rather than on identity. An example of the latter may e.g. be a high level rule stating "map the A001 interface to any of the 1 Gbps ports belonging to operator X and available on service edge 1 or 2".

Figure 7:
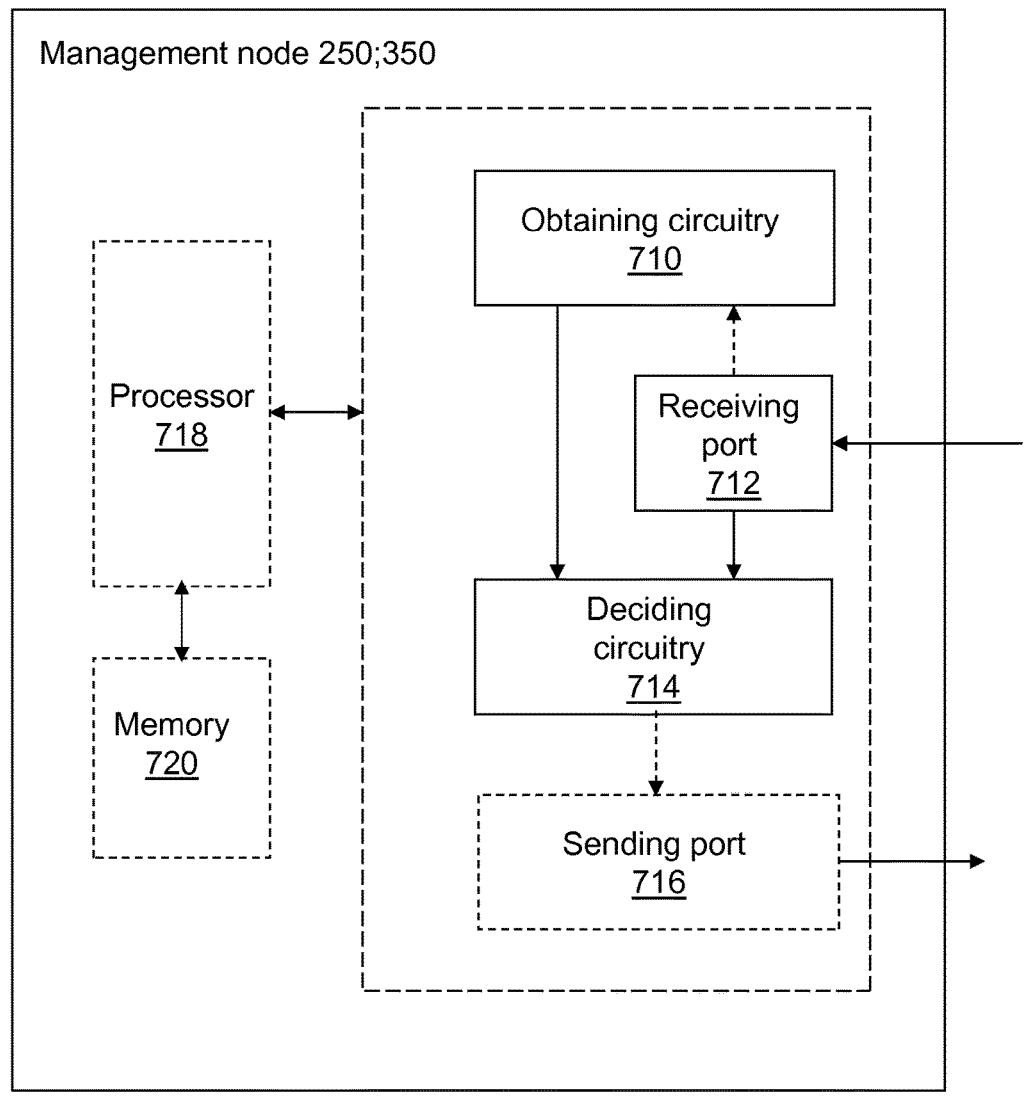
FIG. 7 is a schematic block diagram illustrating a management node according to embodiments herein.

To perform the actions 401-406 above for deciding ports suitable to be communicatively connected to each other in the communications network 210, 310 the management node 250, 350 may comprise an arrangement schematically depicted in FIG. 7.

The management node 250, 350 comprises an obtaining circuitry 710, configured to obtain information associating at least the available port 230A, 330A and the discovered port 233B, 330B with respective one or more attributes and with the respective attribute identifier identifying the respective one or more attributes.

In some embodiments, the obtaining circuitry 710 is further configured to obtain rules for finding ports suitable to be connected. The finding is based on matching attributes and the respective one or more attributes are considered matching based on the obtained rules.

Furthermore, in some embodiments the obtaining circuitry 710 is further configured to obtain the identifier for identifying one or more connection establishing nodes 225, 320A associated with the available port 230A, 330A. In some embodiments the obtaining circuitry 710 is further configured to obtain the identifier for identifying the one or more connection establishing nodes 225, 320B associated with the discovered port 233B, 330B.

The management node 250, 350 further comprises a receiving port 712, configured to receive, from the port discovering network node 225, 320B, the message comprising the attribute identifier associated with the discovered port 233B, 330B.

Moreover, the management node 250, 350 comprises a deciding circuitry 714, configured to decide that the available port 230A, 330A is suitable to be communicatively connected with the discovered port 233B, 330B based on that the respective one or more attributes are considered matching.

In some embodiments, the management node 250, 350 comprises a sending port 716, configured to send the one or more instructions to at least one of the respective one or more connection establishing nodes 225, 320A, 320B. The one or more instructions are commanding a communicative connection to be established between the available port 230A, 330A and the discovered port 233B, 330B. The sending is made in response to that the available port 230A, 330A was decided as suitable to be connected with the discovered port 233B, 330B and which sending is based on at least one of the respective obtained identifiers for identifying the respective one or more connection establishing nodes 225, 320A, 320B.

The embodiments of the management node 250, 350 may be implemented through one or more processors, such as a processor 718 in the management node 250, 350 depicted in FIG. 8, together with computer program code for performing the functions and actions of embodiments herein. In some embodiments the circuitry discussed above may be fully or partially implemented by the processor 718.

The computer program code mentioned above may also be provided as a computer program product, for instance in the form of a data carrier carrying computer program code for performing the embodiments herein when being loaded into the in the management node 250, 350. One such carrier may be in the form of a CD or DVD. It is however feasible with other data carriers such as a memory stick, memory card or hard drive. The computer program code may furthermore be provided as pure program code on a server for download to the management node 250, 350. The computer program code may furthermore be provided in the form of a data file or files on, or available through, a server for download. The file or files may be executable files for direct or indirect download to and execution on the management node 250, 350, or may be for intermediate download and compilation to make them executable before download to and for execution in the management node 250, 350. The server may be accessible over a computer network, such as the Internet, and may e.g. be a web or ftp server.

The management node 250, 350 may further comprise a memory 720 comprising one or more memory units. The memory 720 is arranged to store data, such as the above-mentioned attributes, identifiers and/or rules etc., and/or configurations and/or applications to perform the method when being executed in the management node 250, 350.

Those skilled in the art will also appreciate that the circuitry and ports 710-716 may refer to a combination of analog and digital circuits, and/or one or more processors configured with software and/or firmware (e.g., stored in memory) that, when executed by the one or more processors such as the processor 718, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Note that the above-mentioned physical communications channel may be a layer 1 (L1) physical communications channel, which e.g. is the case when the physical communications channel is said wavelength channel. However, in some embodiments the respective port, such the available port 230A, 330A and the discovered port 233B, 330B, may be communicatively connected to the communications network 210, 310 via a communications channel that comprises one or more higher layer communications channels, such as layer 2 (L2) and/or layer 3 (L3) and/or higher layer communications channels.

Embodiments herein relate to establishment of communicative connections between ports, such as via the physical communications channel discussed above. Communicative connections may thus be established between physical ports such as 100 Gbps IP over WDM ports. However, embodiments herein, as should be realized from the above, may as well be used to additionally decide upon and/or configure service and/or logical related communicative connections between ports, i.e. not only in the case of physical communicative connections between the ports. For example Open Systems Interconnection (OSI) model (ISO/IEC 7498-1) L2 or L3 Virtual Private Networks (VPNs), L2 Virtual Private LAN Service (VPLS), IP/Multi-protocol Label Switching (MPLS) Label Switched Paths (LSPs), pseudo-wires, time division multiplexed (TDM) channels etc. according to particular service end-points and Service Level Agreements (SLAs).

It should be understood that embodiments herein, and as described above, enable a network designer to start from desired services required in a communications network and set up attributes, possible with additional rules, and that the embodiments herein facilitate implementing the network design, including establishing desired communicative connections between ports in the communications network, in an automated fashion.

Moreover, embodiments herein may be viewed upon as providing a solution that converts a problem of identifying matching ports from a substantially infinite set of possibilities to a problem of identifying matching ports in a finite set of possibilities, which significantly reduces the operation and implementation complexity and facilitates automated implementation. It also supports operator specific network designs and is compatible with multi-operator, multi-vendor communications networks as mentioned above. Achieving automatic, or a higher degree of, connection set-up that today, has a potential of huge operational cost saving for an operator in a communication network.

Generally, embodiments herein are not limited to the above described features and details. Various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "consist at least of".

The invention claimed is:

1. A method in a management node for deciding ports suitable to be communicatively connected to each other in a communications network, the communications network comprising an available port comprised in a first network node and communicatively connected to the communications network, and a discovered port comprised in a second network node, wherein the discovered port is a port discovered as being communicatively connected to the communications network, wherein the method comprises:
    obtaining information associating at least the available port and the discovered port with respective plurality of attributes and with a respective attribute identifier identifying the respective plurality of attributes, wherein one or more attributes of the available port and one or more attributes of the discovered port, respectively, comprise different attributes of a same type, and wherein the respective different attributes of the same type are valid simultaneously for the available port and the discovered port respectively;
    identifying that the available port belongs to a higher tier network and the discovered port belongs to a lower tier network;
    receiving, from a port discovering network node, a message comprising the respective attribute identifier associated with the discovered port;
    obtaining, in response to the received message, rules for determining that the available port is suitable to be connected with the discovered port;
    matching the one or more attributes of the available port with the one or more attributes of the discovered port based on the obtained rules; and
    deciding that the available port is suitable to be communicatively connected with the discovered port based on the identifying and based on a match between the one or more attributes associated with the available port and the one or more attributes associated with the discovered port.

2. The method as claimed in claim 1, wherein the communications network is a wavelength division multiplexed (WDM) optical network, and wherein each of the discovered port and the available port is a respective optical port in the WDM optical network.

3. The method as claimed in claim 1, wherein the respective attribute identifier comprises a port identifier identifying a respective port independently, and wherein the respective port is communicatively connected to the communications network.

4. The method as claimed in claim 1, wherein the respective attribute identifier comprises an equipment identifier identifying a respective equipment associated with a respective port independently, and wherein the respective port is communicatively connected to the communications network.

5. The method as claimed in claim 1, wherein a respective port being communicatively connected to the communications network comprises that the respective port is providing a respective physical communications channel connecting the respective port to a connection node of the communications network, whereby information being sent in the communications network is enabled to be sent via the respective physical communications channel to and/or from the respective port.

6. The method as claimed in claim 5, wherein the communications network is a wavelength division multiplexed (WDM) optical network, wherein each of the discovered port and the available port is a respective optical port in the WDM optical network, and wherein the respective physical communications channel is a wavelength channel.

7. The method as claimed in claim 1, wherein a respective port being communicatively connected to the communications network comprises that the respective port has been assigned a respective logical address in the communications network, and wherein the respective logical address enables information being sent in the communications network to be addressed to and thereby reach the respective port.

8. The method as claimed in claim 1, wherein the method further comprises:
obtaining an identifier for identifying one or more connection establishing nodes associated with the available port, and/or obtaining an identifier for identifying one or more connection establishing nodes associated with the discovered port; and
sending one or more instructions to at least one of the respective one or more connection establishing nodes, wherein the one or more instructions command a communicative connection to be established between the available port and the discovered port, wherein the one or more instructions are sent when the available port is decided as suitable to be connected with the discovered port and wherein the sending is based on at least one of the respective obtained identifiers for identifying the respective one or more connection establishing nodes.

9. The method as claimed in claim 8, wherein the one or more instructions further command configuration of at least one of the discovered port and the available port based on at least one of the one or more attributes associated with a respective port.

10. The method as claimed in claim 8, wherein the identifier for identifying the one or more connection establishing nodes associated with the discovered port comprises a logical address assigned to the discovered port, and/or wherein the identifier for identifying the one or more connection establishing nodes associated with the available port comprises a logical address assigned to the available port.

11. The method as claimed in claim 8, wherein at least one of the one or more connection establishing nodes comprises a hub node configured to route traffic between one or more ports of the higher tier network of the communications network and one or more ports of the lower tier network being a sub-network to the higher tier network.

12. The method as claimed in claim 1, wherein the received message further comprises additional one or more attributes associated with the discovered port, and wherein the additional one or more attributes after the message have been received are added to and included with the one or more attributes from the obtained information that are associated with the discovered port.

13. The method as claimed in claim 1, wherein both the one or more attributes associated with the available port, and the one or more attributes associated with the discovered port, comprise a respective attribute that identifies a service type indicating traffic of a particular type of service that is associated with a respective port.

14. The method as claimed in claim 1, wherein both the one or more attributes associated with the available port, and the one or more attributes associated with the discovered port, comprise a respective attribute that identifies communication properties associated with a respective port.

15. The method as claimed in claim 1, wherein both the one or more attributes associated with the available port, and the one or more attributes associated with the discovered port, comprise a respective attribute identifying a desired number of connections between the first network node and the second network node.

16. A management node for deciding ports suitable to be communicatively connected to each other in a communications network, the communications network comprising an available port comprised in a first network node and communicatively connected to the communications network, and a discovered port comprised in a second network node, wherein the discovered port is a port discovered as being communicatively connected to the communications network, and wherein the management node comprises:
an obtaining circuitry, configured to obtain information associating at least the available port and the discovered port with respective plurality of attributes and with a respective attribute identifier identifying the respective plurality of attributes, wherein one or more attributes of the available port and one or more attributes of the discovered port, respectively, comprise different attributes of a same type, and wherein the respective different attributes of the same type are valid simultaneously for the available port and the discovered port respectively;
a receiving port, configured to receive, from a port discovering network node, a message comprising the respective attribute identifier associated with the discovered port,
wherein the obtaining circuitry is further configured to obtain, in response to the message received by the receiving port, rules for determining that the available port is suitable to be connected with the discovered port, wherein the management node is configured to identify that the available port belongs to a higher tier network and the discovered port belongs to a lower tier network, and wherein the management node is further configured to match the one or more attributes of the available port with the one or more attributes of the discovered port based on the obtained rules; and
a deciding circuitry, configured to decide that the available port is suitable to be communicatively connected with the discovered port based on the identification and based on a match between the one or more attributes associated with the available port and the one or more attributes associated with the discovered port.

17. The management node as claimed in claim 16, wherein the communications network is a wavelength division multiplexed (WDM) optical network, and wherein each of the discovered port and the available port is a respective optical port in the WDM optical network.

18. The management node as claimed in claim 16, wherein the respective attribute identifier comprises a port identifier identifying a respective port independently, and wherein the respective port is communicatively connected to the communications network.

19. The management node as claimed in claim 16, wherein the attribute identifier comprises an equipment identifier identifying a respective equipment associated with a respective port independently, and wherein the respective port is communicatively connected to the communications network.

20. The management node as claimed in claim 16, wherein a respective port being communicatively connected to the communications network comprises that the respective port is providing a respective physical communications channel connecting the respective port to a connection node of the communications network, whereby information being sent in the communications network is enabled to be sent via the respective physical communications channel to and/or from the respective port.

21. The management node as claimed in claim 20, wherein the communications network is a wavelength division multiplexed (WDM) optical network, wherein each of the discovered port and the available port is a respective optical port in the WDM optical network, and wherein the respective physical communications channel is a wavelength channel.

22. The management node as claimed in claim 16, wherein a respective port being communicatively connected to the communications network comprises that the respective port has been assigned a respective logical address in the communications network, wherein the respective logical address enables information being sent in the communications network to be addressed to and thereby reach the respective port.

23. The management node as claimed in claim 16, wherein the obtaining circuitry is further configured to obtain an identifier for identifying one or more connection establishing nodes associated with the available port, and/or is further configured to obtain an identifier for identifying one or more connection establishing nodes associated with the discovered port; wherein the management node further comprises a sending port, configured to send one or more instructions to at least one of the respective one or more connection establishing nodes, wherein the one or more instructions command a communicative connection to be established between the available port and the discovered port, wherein the one or more instructions are sent when the available port is decided as suitable to be connected with the discovered port and wherein the sending is based on at least one of the respective obtained identifiers for identifying the respective one or more connection establishing nodes.

24. The management node as claimed in claim 23, wherein the one or more instructions further command configuration of at least one of the discovered port and the available port based on at least one of the one or more attributes associated with a respective port.

25. The management node as claimed in claim 23, wherein the identifier for identifying the one or more connection establishing nodes associated with the discovered port comprises a logical address assigned to the discovered port, and/or wherein the identifier for identifying the one or more connection establishing nodes associated with the available port comprises a logical address assigned to the available port.

26. The management node as claimed in claim 23, wherein at least one of the one or more connection establishing nodes comprises a hub node configured to route traffic between one or more ports of the higher tier network of the communications network and one or more ports of the lower tier network being a sub-network to the higher tier network.

27. The management node as claimed in claim 23, wherein the received message further comprises additional one or more attributes associated with the discovered port, and wherein the additional one or more attributes after the message have been received are added to and included with the one or more attributes from the obtained information that are associated with the discovered port.

28. The management node as claimed in claim 16, wherein both the one or more attributes associated with the available port, and the one or more attributes associated with the discovered port, comprise a respective attribute that identifies a service type indicating traffic of a particular type of service that is associated with a respective port.

29. The management node as claimed in claim 16, wherein both the one or more attributes associated with the available port, and the one or more attributes associated with the discovered port, comprise a respective attribute that identifies communication properties associated with a respective port.

30. The management node as claimed in claim 16, wherein both the one or more attributes associated with the available port, and the one or more attributes associated with the discovered port, comprise a respective attribute identifying a desired number of connections between the first network node and the second network node.

* * * * *